Patented May 23, 1944

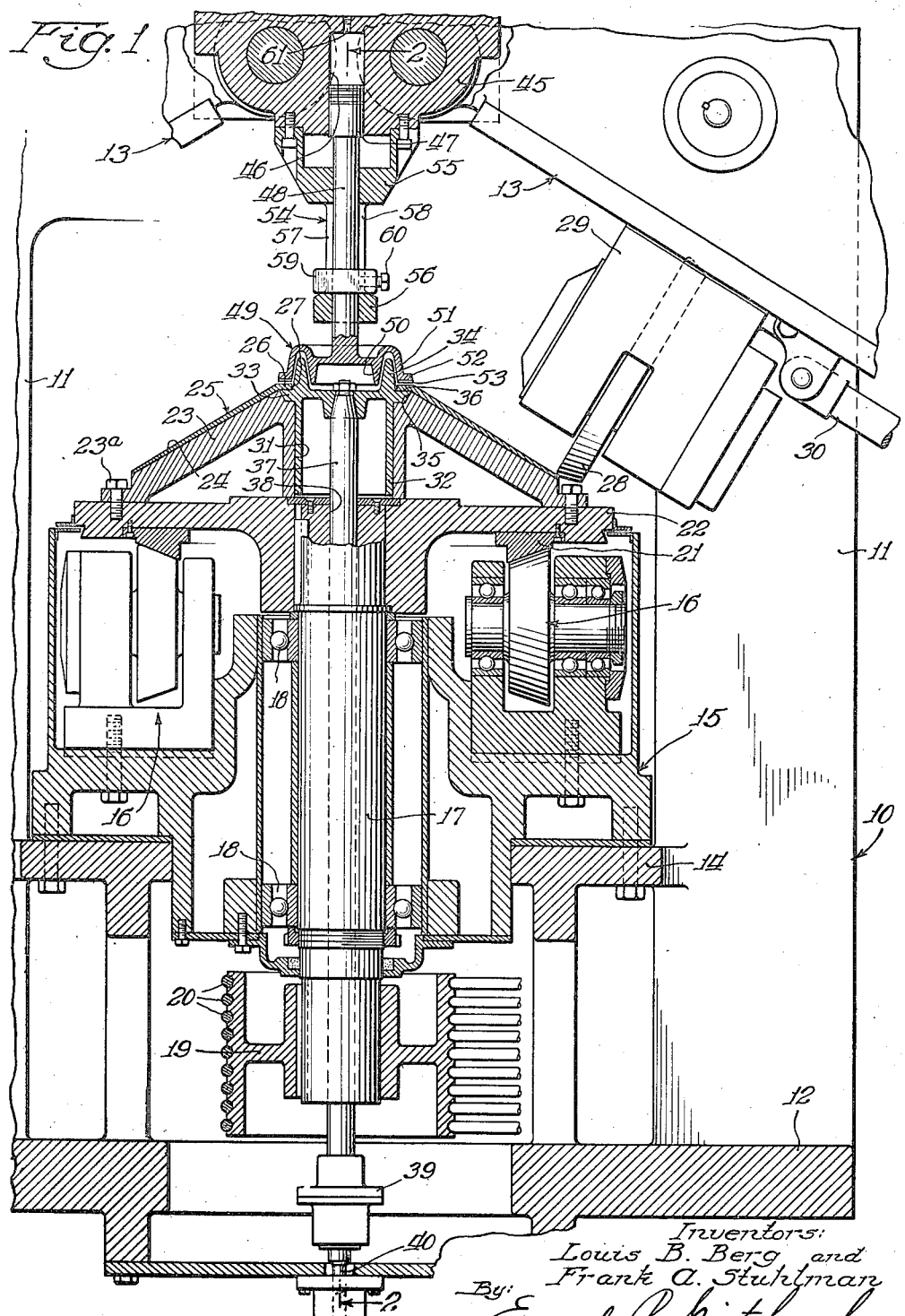

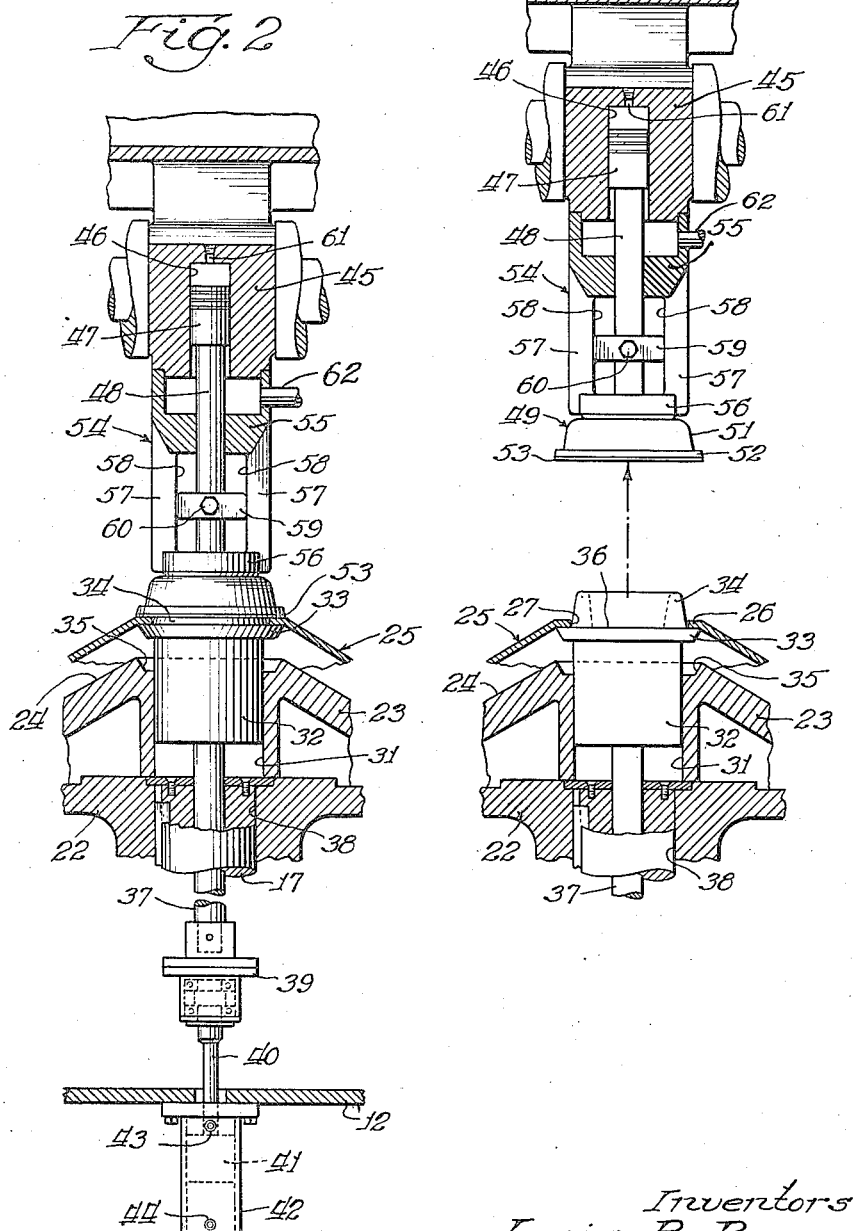

2,349,606

UNITED STATES PATENT OFFICE 2,349,606

BLANK-HANDLING APPARATUS

Louis B. Berg, Chicago, and Frank A. Stuhlman, Forest Park, Ill., assignors to Borg-Warner Corporation, Chicago, Ill., a corporation of Illinois Application December 1, 1941, Serial No. 421,160

6 Claims. (Cl. 80—16)

This invention relates to blank handling apparatus and particularly to an apparatus for handling discs, cones and the like. For purposes of illustration this invention will be described with reference to its application to a machine for rolling circular objects.

In a copending application of Adolph Doderer, Serial No. 419,280, filed November 15, 1941, there is described a machine for rolling conical blanks. The machine is comprised of a rotatable conical platen, a frame for supporting the rotatable platen and also for supporting a roll carrying head, a crank and connecting rod mechanism for reciprocating the head relative to the platen, and hydraulic means for effecting the reciprocation of the head relative to the platen. A pair of rolls is provided in the reciprocable head with means for traversing the rolls over the surface of a blank mounted on the rotatable platen. The present invention will be described with reference to its adaptation to the machine disclosed in the aforesaid Doderer application and it is intended that the Doderer machine forms a part of the present disclosure.

In order to roll or otherwise form a circular or conical blank, it is necessary that the blank be rotated at a relatively high speed with reference to the tool which is to do the forming. In the case of a rolling machine, a platen is provided upon which a blank to be rolled is placed, and the platen is rotated at a high speed while the blank is contacted by a roll which is traversed over the surface of the blank. To safeguard the operator of the machine it is necessary that the blank be retained on the platen while it is being rotated, the retaining means being such that it would be substantially impossible for the blank to leave the platen while the blank is spinning, and that the blank should be under complete control while yet in motion. It is also imperative that when the blank is inserted into the machine, it can be placed therein in perfect safety despite the fact that the platen may be rotating continuously.

The principal object of this invention is to provide a blank handling apparatus for a machine wherein continuously rotatable means is provided for rotating the blank, the blank handling apparatus being such as to render the insertion of a blank into the machine, or the removal of the blank therefrom, perfectly safe.

Another object of this invention is to provide a blank handling apparatus for a machine having a rotatable platen for supporting the blank wherein the rotation of the blank is arrested before the blank can be removed from the machine.

Another object of this invention is to provide a blank handling apparatus for a machine having a continuously rotatable platen wherein the blank is clamped against rotation while it is being removed from the rotatable platen and is not clamped while it is rotated by the platen.

These and other objects and features of this invention will become apparent from the following detailed description when taken together with the accompanying drawings in which:

Fig. 1 is a fragmentary elevation, partly in section, of a machine to which the novel blank handling apparatus may be applied;

Fig. 2 is a fragmentary elevation, partly in section, of the novel blank handling apparatus, said elevation being enlarged to show more clearly the novel features thereof and being taken on line 2—2 of Figure 1; and Fig. 3 is a corresponding fragmentary elevation, partly in section, of the novel blank handling apparatus, showing the apparatus in position to receive a blank.

Referring now to the drawings for a detailed description of the invention and particularly to Fig. 1, the machine to which the invention may be applied is comprised of a frame 10 having upright columns 11 rising from a base 12 and supporting a roll frame mechanism 13 by means of a suitable reciprocating mechanism (not shown) which may be of the type described in the aforementioned Doderer application. Mounted on a platform 14 of frame 10 is a sub-base 15 which supports a plurality of conical roller units 16 spaced equidistantly about a central shaft 17. Said shaft 17 is mounted in bearings 18 suitably supported in sub-base 15 and extends below the lowermost limits of said sub-base. A pulley 19 is keyed to shaft 17 and is adapted to be driven by a series of ropes 20 from a suitable source of power (not shown). Mounted on conical rollers 16 is a conical ring 21, which is bolted to a wheel 22 keyed to shaft 17 so as to be rotatable therewith. A platen 23 is in turn bolted to wheel 22 by means of studs 23a, said platen 23 having a conical surface 24 for receiving a blank 25 thereon. Surface 24, however, may be perfectly flat, or may be dished, or in fact may have any form desired to suit the requirements of the blank which it is to accommodate. In the form shown, however, blank 25 is a conical blank having a central region 26 which is substantially flat and in which is located a central aperture 27.

Roll head 13 is provided with a roll 28 mounted in a roll carriage 29 which is slidably supported in roll head 13 and is adapted to be traversed over blank 25 by means of suitable traversing mechanism (not shown) operating rod 30 which is secured to roll carriage 29. For purposes of illustration roll 28 is shown as a combination rolling and spinning roll which may be used to progressively expand the diameter of the blank. It is forcibly projected against the blank 25 initially at the edge of flat region 26 and is then drawn radially outwardly, rolling and spinning the metal before it as it progresses over the surface of platen 23. It is inherent in this type of rolling that the compressive force exerted by the roller against the blank and platen is sufficient to develop the friction required to rotate blank 25 with platen 23 so that no additional clamping means is required to maintain the blank on the platen while the blank is being rolled. In the apparatus disclosed, therefore, no clamping means is provided for holding a blank against platen 23 during the rolling operation, and hence, blank 25 is free to move relative to platen 23 except for the holding action provided by roll 28.

The blank handling apparatus is shown in detail in Figs. 2 and 3. Referring to these figures now, platen 23 is provided with a central cylindrical opening 31 in which is slidably mounted a cylindrical casting 32 having a radially extending flange 33 and an axially extending flange 34. Said flange 33 is adapted to fit into a recess 35 provided for it in platen 23. The upper surface 36 of radial flange 33 is made substantially flat to cooperate with the under surface of flat region 26 of blank 25. Axial flange 34 is tapered and, at its base, that is, at its point of juncture with radially extending flange 33, is of substantially the same diameter as central opening 27 in blank 25. Thus a blank 25 may be slipped over flange 34 and dropped onto flange 33, flange 34 performing the function of a centering pin and flange 33 serving to support the blank with reference to casting 32.

Referring again to Fig. 1, casting 32 is shown in its lowermost or retracted position with respect to platen 23. Said casting 32 is reciprocated relatively to platen 23 by means of a rod 37 to which casting 32 is fixed, said rod 37 passing downward through an opening 38 in shaft 17 to a coupling 39 which is axially fixed to a piston rod 40 operated by a piston 41 (Fig. 2) in a hydraulic cylinder 42. Coupling 39 may rotate relative to piston rod 40 so that when casting 32 is withdrawn into platen 23 and rotates with it, it will not be necessary for piston rod 40 to rotate likewise. Suitable fluid under pressure may be admitted to either side of piston 41 by means of conduits 43 and 44. When said fluid is admitted to the upper side of piston 41, the latter is moved downward and retracts casting 32 into platen 23, and similarly, when fluid under pressure is admitted to the underside of piston 41 said piston is pushed upward to move casting 32 upward relative to platen 23.

Casting 32 constitutes the lower half of the novel handling mechanism. The upper half will now be described:

Roll head 13 (Fig. 1) is provided with a central casting 45 in which is formed a cylindrical opening 46 which constitutes the cylinder of a hydraulic mechanism. Within cylinder 46 is a piston 47 which is secured to a rod 48 the lower end 49 of which is provided with concentric conical flanges 50 and 51 between which flange 34 of casting 32 is adapted to be received. The outer end of flange 51 is formed into a radial flange 52 having a hard wear resisting friction facing 53 made of stellite or similar material. Said flange 52 is substantially coextensive with the upper surface of flat region 26 of blank 25.

Piston rod 48 is guided by means of a casting 54 which is bolted to casting 45 of roll head 13. Said casting 54 is provided with spaced guides 55 and 56 in which piston rod 48 is slidably retained. Guide 56 is spaced from guide 55 by a pair of parallel straps 57—57 having parallel opposed surfaces 58—58. A substantially square sided guide 59 is adapted to slide between surfaces 58 on straps 57 and is secured to piston rod 48 by means of a set screw 60. Guide 59 may be secured to piston rod 48 at any one of a number of positions, but is preferably so located on rod 48 that when rod 48 moves downward, guide 59 will stop the rod by contacting support 56, and when so stopped, flange 52 will be out of contact with the upper surface of flat region 26 of blank 25. It will be noted that since guide 59 is square-shaped and is secured to rod 48, neither rod 48 nor its associated flanges 50, 51 and 52 can rotate about the axis of said rod 48.

Suitable fluid under pressure may be admitted into cylinder 46 by means of a conduit 61 located at the upper end of the cylinder to urge the rod 48 downwardly, and a conduit 62 is provided in the casting 54 for admitting suitable fluid under pressure to the bottom of the piston 47 to urge the rod 48 upwardly.

The operation of the blank handling apparatus is as follows:

The apparatus is initially in the position shown in Fig. 3 wherein casting 32 has been raised by admitting fluid under pressure into conduit 44 below piston 41. This caused piston 41 to move upward thereby moving with it piston rod 40, coupling 39, rod 37, and casting 32. While in the raised position, radial flange 33 is above platen 23 and casting 32 may or may not be rotating, depending upon whether platen 23 is being driven at the time by shaft 17 and its associated pulley 19. If platen 23 is being rotated, the viscosity of the lubricant between the casting 32 and platen 23 and also between rod 37 and its surrounding shaft 17 may be sufficient to cause the casting to rotate. The casting, however, may be stopped with very little force if it should be rotating under these conditions.

While casting 32 is in its raised position, head 13 is likewise in a raised position and cylinder 46 and its associated piston 47, piston rod 48 and flanges 50, 51 and 53 are likewise in a raised position. The head 13 is adapted to move relatively to platen 23 a much greater distance than casting 32 so that a substantial space may be provided between flange 34 and the lowermost point of flange 52 for the ready insertion of a blank into the machine. A blank to be rolled is then placed between flanges 33 and 52 and is slipped over flange 34, the conical surface thereof serving to assist in locating the aperture in the blank and causing the blank to assume a proper coaxial relation with respect to platen 23. Blank 25 will continue to slide down flange 34 until it strikes radial flange 33, whereupon it will receive support therefrom as long as casting 32 is in a raised position.

Next, fluid is admitted into cylinder 46 to lower the piston and its associated mechanism, and finally, the entire roll head 13 is lowered to begin the rolling operation. Roll 28, of course, will have been moved radially inward to its starting position. Just prior to the roll contacting blank 25, however, flange 34 will have begun to enter the space between flanges 50 and 51 in the upper portion of the mechanism, thereby effectively locking the blank against lateral movement. At this point a blank may still move vertically with respect to casting 32, but it cannot leave the machine, and hence any accidental turning of the platen such as might result from contact between the blank and roll 28, which may still be spinning under the influence of inertia forces developed during a previous operation, cannot result in injury to the operator of the machine.

Continued downward movement of the roll head gradually decreases the gap between flange 33 on lower casting 32 and flange 52 on the upper portion of the mechanism, but flat region 26 is not gripped between the said two flanges at any time during the downward movement. Simultaneously, casting 32 is gradually withdrawn by removing pressure from below piston 41 and applying pressure above piston 41, and continues to move downward until flange 33 is seated in recess 35. Roll head 13 is stopped in its downward movement at the point where roll 28 commences its rolling operation, and said roll and its associated carriage and rod 39 are then moved substantially radially across the surface of blank 25 to perform the rolling and spinning operations desired. Said roll moves completely off blank 25 at the end of its travel and this frees the blank for vertical movement relative to the roll. Such movement is then effected by again admitting fluid under pressure into conduit 44 beneath piston 41 and causing said piston to move upward, thereby moving with it casting 32. This causes flange 33 to lift the finished blank 25 off platen 23 and into contact with stellited surface 53 of flange 52. It will be remembered that platen 23 is continuously rotated and that the blank is likewise rotating due to inertia forces which have been developed therein. Flange 52, however, is stationary and cannot rotate because of the square guide 59 to which it is secured and which is held against rotation by straps 57. Contact between flat region 26 and stellite surface 53, therefore, causes the latter to act as a brake upon the blank and the blank stops rotating as well as casting 32 and its associated operating mechanisms. Roll head 13 is then raised, carrying with it the upper portion of the handling apparatus. Casting 32 follows the upper portion a part of the distance as shown in Fig. 3 and then brake surface 53 continues to move away from blank 25 to its upper limiting position. The radial flange 52 may also move upwardly with casting 32 along with movement of the piston 47 in the cylinder 46 when the head 13 is stationary, and in this case after such movement, the parts will be in the relative positions as shown in Fig. 2. The head 13 and the piston 47 in the cylinder 46 may also be moved upwardly simultaneously if desired. Blank 25 may then be removed from flanges 33 and 34 and a fresh blank inserted thereto to repeat the cycle.

Thus it will be apparent from the foregoing description that a blank handling apparatus has been provided which locks the blank in place above a rotating platen to prevent any accidental movement of the blank off the rotating platen which might injure an operator, and it likewise provides a means for arresting the rotation of the blank just prior to the removal of the blank from the machine so that the operator will not be required to handle a rotating blank.

It is understood that the foregoing description is merely illustrative of a preferred embodiment of the invention and that the scope of the invention, therefore, is not to be limited thereto but is to be determined by the appended claims.

We claim:

1. A mechanism for handling apertured objects which are to be worked against a rotatable form, said mechanism comprising a support for the object movable to and from said form, said support having an element passing through the aperture in the object, a non-rotatable abutment opposite the support, means mounted on said abutment and movable toward and away from said support, said means having an element which is adapted to overlap the element on the support whereby to prevent the object from accidentally leaving the form, and means for preventing the first mentioned means from rotating, said first mentioned means being adapted to clamp the object to the support to prevent the object from rotating.

2. A mechanism for handling apertured objects which are to be worked against a rotatable form, said mechanism comprising a support for the object, said support having an element passing through the aperture in the object, a non-rotatable abutment opposite the support, means for moving the abutment toward and away from the form, means movable with said abutment adapted to operate upon the object to change its form, means mounted on said abutment and movable toward and away from said support relative to said abutment, said last mentioned means having an element which is adapted to overlap the element on the support whereby to prevent the object from accidentally leaving the form, and means for holding the means mounted on said abutment against rotation, said means mounted on said abutment being adapted to clamp the object against the support to prevent rotation of the object.

3. A mechanism for handling apertured objects which are to be worked against a rotatable form, said mechanism comprising a shaft concentric with the rotatable form, means for reciprocating the shaft axially, a support on said shaft, said support having a radial flange and an axial flange, said axial flange being adapted to pass through the aperture in the object to center said object on the form, a non-rotatable abutment opposite the support, means mounted on said abutment and movable toward and away from said support, said means having a radial flange and an axial flange, said axial flange being adapted to surround the axial flange of the support, and means cooperating with the non-rotatable abutment to prevent rotation of the means mounted on the abutment.

4. A mechanism for handling apertured objects as described in claim 3, and means for limiting the movement of the means mounted on the abutment toward and away from the support, said limiting means being so adjusted that the radial flange on said abutment means is out of contact with the apertured object while said object is being worked.

5. A mechanism for handling apertured objects which are to be worked against a rotatable form, said mechanism comprising a support for the object, said support having an element passing through the aperture in the object, means for moving the support relatively to the form whereby in one position the object is raised from the form and in another position the object rests on the form, a working head reciprocable relative to the form, a working tool on the head adapted to cooperate with the object to change its form, means reciprocable relative to the head and having an element which is adapted to overlap the element on the support, means for causing the second-mentioned means to overlap the element on the support, means for simultaneously moving the second-mentioned means and the support toward the form while said elements are overlapped, said object being free to rotate relative to the support during the movement toward the form, and means for first raising the object from the form and then holding it against the second-mentioned means while the object is being raised from the form.

6. A mechanism for handling apertured objects as described in claim 5, said second-mentioned means having a brake surface thereon adapted to be contacted by the object while it is being raised from the form, whereby to arrest the rotation of the object preparatory to its removal from the mechanism.

LOUIS B. BERG.
FRANK A. STUHLMAN.